UNITED STATES PATENT OFFICE.

KONSTANTIN TARASSOFF, OF DOBROSLOBODSKY, MOSCOW, RUSSIA.

MANUFACTURE OF THE PRODUCTS OF CONDENSATION OF PHENOLS WITH FORMALDEHYDE AND THE LIKE.

1,235,507.   Specification of Letters Patent.   Patented July 31, 1917.

No Drawing.   Application filed May 1, 1914.   Serial No. 835,730.

*To all whom it may concern:*

Be it known that I, KONSTANTIN TARASSOFF, a subject of the Czar of Russia, residing at Dobroslobodsky, pereoolock 4, Rasgulay, Moscow, Russia, have invented certain new and useful Improvements in the Manufacture of the Products of Condensation of Phenols with Formaldehyde and the like, of which the following is a specification.

This invention relates to improvements in the production of compositions of matter from phenols, formaldehyde and the like.

In the specification belonging to my British application, No. 528 of 1914, a process is described for the manufacture of condensation products from formaldehyde and the like with phenols, in which an aldehyde, a phenol and sulfo-acids derived from mineral oils, or sulfo aromatic fatty acids, or sulfonated fats and oils, are caused to react together.

It has now been found that besides the sulfonated bodies mentioned sulfonated resin oils may also be employed in the condensation of the aldehyde or its equivalent with the phenol.

The conditions under which the reactions are carried out, as well as the properties and relative quantities of the substances undergoing treatment, have a marked influence on the nature of the products obtained and the invention comprises the production of bodies having the most diverse properties as, for example, in the matter of solubility, fusibility, inertness to the action of reagents and so forth. The invention thus permits of obtaining products suitable for a wide variety of applications. For example, one may alter the properties of the product in some cases by varying the amount of the aldehyde or its equivalent. Thus, if a relatively small quantity of formaldehyde, for example, be used, a fusible, copal-like substance, soluble in alcohol, can be obtained, while by employing larger quantities of aldehyde infusible, hard and elastic products can be prepared.

The invention is not limited to the use of a particular aldehyde or phenol, but any suitable member of either of these classes of compounds, or derivatives thereof, may be employed. Thus, instead of the aldehyde, its polymers may be used, or derivatives, as hexamethylenetetramin. Further, any suitable resin oil may be utilized and the sulfonated product may be employed either alone or in admixture with other sulfonated acids for instance with the sulfo-acids obtained by treating crude petroleum with sulfuric acid.

The sulfonation of the resin oils used for the purposes of the invention may be effected under similar conditions to those obtaining in the sulfonation of fatty glycerids, for example, the body to be sulfonated may be mixed in the cold with varying amounts of sulfuric acid, or equivalent sulfonating agent, according to circumstances or the particular substance or substances under treatment, and the excess of mineral acid subsequently washed out with water or salt solutions.

The various products obtained may be submitted, as desired, to different modes of treatment, as for example, to the action of heat according to the nature of the substance required and the particular end in view and fillers and coloring matters may be incorporated with the products at any suitable stage of the process of their manufacture.

Example: 100 grams of commercial carbolic acid 93–100%, a suitable proportion of sulfo-acids, obtained by treating resin oil with sulfuric acid in aqueous solution and 50 grams formaldehyde in the form of 40% solution are mixed together and the mixture brought to the temperature of 60–80° C. a reaction takes place which is accompanied by selfheating and boiling. As soon as ebullition ceases the mixture is again submitted to the action of heat until its weight has fallen by about 55 grams and the whole is then cooled to about 20–25° C. and a further 40 grams of formaldehyde 40% solution are added and the mixture is carefully stirred until a completely homogeneous mass is produced, which gradually thickens on standing.

The thickened mass may then be poured into molds in which it is maintained first at the ordinary temperature for some hours and at 75° for about half an hour, then at 90° and finally at 100° C. There is thus obtained about 200 grams of an infusible insoluble mass which is extremely hard and completely homogeneous and of dark gray color, and which retains the shape of the vessel in which the fluid condensation products were contained during the second stage of the process.

What I claim is:

1. The process of producing compositions of matter which comprises causing phenol, formaldehyde and sulfonated resin oil to react together.

2. The process of producing compositions of matter which comprises causing phenol, formaldehyde, sulfonated resin oil and sulfo acids obtained by treating crude petroleum with sulfuric acid, to react together.

In testimony whereof I have signed my name to this specification in the presence of two subscribing witnesses.

KONSTANTIN TARASSOFF.

Witnesses:
GREGORI PETROFF,
LYDIA RO'LL.